US006325508B1

(12) United States Patent
Decreton et al.

(10) Patent No.: US 6,325,508 B1
(45) Date of Patent: Dec. 4, 2001

(54) VISUAL EQUIPMENT FOR CHECKING CLOSE VISION WORKING DISTANCE

(75) Inventors: Bruno Decreton, Charenton le Pont; Thierry Bonnin, Yerres; Bjorn Drobe, Paris; Isabelle Poulain, Sucy En Brie; Gilles le Saux, Paris; Francoise Ahsbahs, Saint Maur des Fosses, all of (FR)

(73) Assignee: Essilor International, Cedex (FR)

( * ) Notice: Subject to any disclaimer, the term of this patent is extended or adjusted under 35 U.S.C. 154(b) by 0 days.

(21) Appl. No.: 09/471,600

(22) Filed: Dec. 23, 1999

(30) Foreign Application Priority Data

Sep. 24, 1999 (FR) .................................................. 99 11941

(51) Int. Cl.⁷ ................................ G02C 7/02; G02C 1/00

(52) U.S. Cl. .......................... 351/159; 351/41; 351/158

(58) Field of Search .................................. 351/158, 159, 351/41, 209, 210

(56) References Cited

U.S. PATENT DOCUMENTS

| 3,654,477 | * | 4/1972 | Benjamin, Jr. ...................... 250/552 |
| 3,993,407 | * | 11/1976 | Moricca et al. .................... 356/3.14 |
| 4,181,408 | | 1/1980 | Senders ............................... 351/159 |
| 4,865,438 | * | 9/1989 | Wada ................................... 351/158 |
| 5,182,585 | | 1/1993 | Stoner ................................. 351/41 |
| 5,359,444 | | 10/1994 | Piosenka et al. .................... 359/94 |
| 5,949,519 | | 9/1999 | Le Saux et al. ..................... 351/169 |
| 5,982,286 | * | 11/1999 | Vanmoor ............................ 340/573.4 |

FOREIGN PATENT DOCUMENTS

| 2250568 | 4/1999 | (CA) . |
| 2250615 | 4/1999 | (CA) . |
| WO97/17043 | 5/1997 | (WO) . |

OTHER PUBLICATIONS

Charman, "Near Vision, Lags of Accommodation and Myopia," *Ophthal. Physiol. Opt.*,19:2, pp. 126–133, 1999.

Goss et al.,"Effectiveness of Bifocal Control of Childhood Myopia Progression as a Function of Near Point Phoria and Binocular Cross–Cylinder," *Journal of Optometric Vision Development*, vol. 26, pp. 12–17, Spring 1995.

Goss, "Overcorrection as a Means of Slowing Myopic Progression," *American Journal of Optometry & Physiological Optics*, 61:2, pp. 85–93, Feb. 1984.

Goss et al., "Clinical Findings Before the Onset of Myopia in Youth. I. Ocular Optical Components," *Optometry and Vision Science*, 72:12, pp. 870–878, Dec. 1995.

Grosvenor, "Can Myopia be Controlled?—Part 1: Epidemioloyg of Myopia," *Optometric Monthly*, pp. 54–58, Aug. 1980.

Grosvenor, "Can Myopia be Controlled?—Part 2: The Bates System of Eye Exercises," *Optometric Monthly*, pp. 50–54, Sep. 1980.

(List continued on next page.)

Primary Examiner—Jordan M. Schwartz
(74) Attorney, Agent, or Firm—Fish & Richardson P.C.

(57) ABSTRACT

There is provided a spectacle frame 1, having a least one corrective lens the characteristics of which do not vary over time and having telemetry means 5 which set off an alarm 9, 10 when the distance measured by the telemetry means is less than a predetermined preference distance. This reference distance can for example be set at between 20 and 50 cm depending on the spectacle wearer. A kit is also provided comprising a frame, telemetry means and an alarm. The spectacle frame can be prescribed for slowing down the evolution of acquired myopia in children who are starting to acquire myopia; here, the spectacle frame is provided with progressive multifocal lenses. The telemetry means and alarm incite the child to respect a sufficient working distance for close vision.

27 Claims, 1 Drawing Sheet

OTHER PUBLICATIONS

Grosvenor, "A Review and a Suggested Classification System for Myopia on the Basis of Age–Related Prevalence and Age of Onset," *American Journal of Optometry and Physiological Optics,* 64:7, pp. 545–555, Jul. 1987.

Rosenfield, "Accommodation and Myopia," *Myopia and Nearwork*, pp. 91–116, 1998.

Tokoro et al., Treatment of the Myopia and the Changes in Optical Components. Report II. Full or Under–Correction of Myopia by Glasses, *Acta Soc. Ophthamol. Jp.,* vol. 69, pp. 140–144, 1965.

Yap et al., "Environmental Factors and Refractive Error in Chinese Schoolchildren," *Clinical and Experimental Optometry,* 77:1, pp. 8–14, Jan./Feb. 1994.

* cited by examiner

VISUAL EQUIPMENT FOR CHECKING CLOSE VISION WORKING DISTANCE

BACKGROUND OF THE INVENTION

The present invention concerns the field of visual equipment and in particular a device that encourages spectacle wearers to respect a sufficient working distance for close vision. It is been noticed that some spectacle wearers have a disturbing tendency to come excessively close to their reading or working plane in close vision. This invention discloses a device which when associated with single-focus, bifocal or progressive lenses, enables a spectacle wearer to become aware that he is excessively close. The invention discloses a device which incites the spectacle wearer to correct his posture; in the case of progressive lenses, in addition to posture correction, the invention incites the spectacle wearer to utilize the close vision region of the lens for close work. The invention is particularly adapted to myopic children.

At the state of our current knowledge, we know that myopia is generally the result of a complex process. Poor working conditions (bad posture, insufficient lighting . . . ) favor development of myopia. Close vision work occupies a prime place in the everyday activities of school children. In the case of the myopic child, it is his whole organism, and not only vision, which adapts to the ergonomic demands of working conditions.

Myopic spectacle wearers, when they are reading or performing close vision work, have a tendency to come excessively close to the reading or working plane. They do this by adopting a particular position, consisting in bending over the working plane. An article by W. N. Charman (1999), "Near vision, lags of accommodation and myopia", *Ophthalmic Physiol Opt*, 19: 2, 126–33 showed that moving closer to the reading plane makes it possible to increase the angular size of the object focused on, to increase depth of field by decreasing pupil diameter and reducing the refractive effects of the eye.

The position thus adopted is absolutely uncomfortable, and probably harmful to the back in the case of prolonged and frequent close vision work. Moreover, the fact of bringing the reading plane closer puts greater demands on the visual system. Accommodation and vergence angle increase. A study by M. Rosenfield (1998) "Accommodation and myopia" in: *Myopia and near work* (Rosenfield M. and Gilmartin G. Eds) ButterworthHeinemann, Oxford 91–116, showed that under these conditions, intra-ocular pressure increases. The increase in accommodation lag, it is supposed, increases retinal fuzziness.

It is consequently essential to encourage myopic children to adopt a suitable position for prolonged work in close vision, not only to prevent back problems, but additionally with an aim to avoiding or stopping development of the child's myopia.

Two types of myopia are conventionally distinguished: congenital myopia and acquired myopia; congenital myopia is present at birth, and generally brings about pronounced myopia; it is been estimated that this represents four to six percent of myopia cases. Acquired myopia appears during the lifetime of the subject. Three groups can be distinguished from subjects suffering from acquired myopia, as a function of the age at which the myopia appears; for the first group, myopia appears towards the age of six years, for the second group at the beginning of adult life between 15 and 20 years, and for the third group at the end of the adult age towards age 50. Grosvenor T. (1987), in "A review and a suggested classification system for myopia on the basis of age-related prevalence and age of onset", *Am. J. of Optom. Phvsiol. Opt.*, 64: 7, 545–54 thus proposes a classification of myopia as a function of the age of onset.

It has also been noticed that there is an evolution of myopia with the passage of time. Grosvenor T. (1980) "Can myopia be controlled? Part 1, Epidemiology of myopia" *Optometric Monthly*, August, 54–58 established that towards the age of 6/8, five percent of children suffer from myopia of –0.50 diopters or more, whereas the proportion of subjects afflicted by such myopia is 30/35 percent at university entrance age. At the adult age, there appears to be little evolution in myopia, or in any case, a slower change than in children and young adults.

The percentage of myopic persons in a given population appears to depend on academic level, according to Goss D. A. and Jackson T. W. (1995) "Clinical findings before the onset of myopia in youth. Ocular optical components", *Optom. Vis. Sci.* 72: 12, 870–8), and there appears to be a correlation between the degree of myopia and the number of hours spent each day on close vision work. In Western countries, the proportion of myopia in the population would appear to be between 15 and 20 percent. This proportion reaches 50 percent or even 70 percent in the Asian countries such as China and Japan, according to Yap et al (1994), "Environmental factors and refractive error in Chinese school children", *Clinical and Experimental Optometry*, 77: 1, 8–14. In African countries, the proportion of myopia sufferers, apart from where this is congenital, is, it appears, practically zero.

It has consequently been advanced that acquired myopia is linked with prolonged close vision work, and that the level of myopia depends on the length of time spent working in close vision. Specialists in optometrics have consequently proposed solutions for attempting to slow down progression of the acquired myopia.

One first solution consists in prescribing a correction that is less than the value of a patient's myopia in close vision; the idea is to reduce the accommodation effort to change from far vision to close vision. See for example Tokoro, T., Kobe S. (1965) "Treatment of myopia and changes in optical components. Report II. Full or under-correction of myopia by glasses", *Acta Soc. Ophthamol. Jp.*, 69, 140–44. This type of method is contested and has not proved it is effective.

Another solution consists in prescribing a correction which is too high for far vision. In fact, ametropy of young hypermetropia sufferers is more stable over time than that of young myopia sufferers, and the idea was to render young myopia sufferers hypermetropic, by prescribing a correction which was too large. See for example, Goss D. A. (1984). "Overcorrection as a means of slowing myopic progression". *Am. J. Optom. Physiol. Opt.*, 61: 2, 85–93. The value of this method has also not been demonstrated.

Authors such as Bates, cited by Grosvenor T. (1980) "Can myopia be controlled? Part 2. The Bates system of eye exercises", *Optometric monthly*, September. 50–54, have proposed visual exercises: Repeated visual experiences, relaxation, as well as exercising for relieving eye tension. Proof of the effect on the subject's ametropy is not forthcoming.

Finally, specialists in optometrics have attempted to slow down the evolution of myopia by prescribing a power addition for close vision; here, the patient is asked to look through a patch of glass when doing close vision work, this patch having the power needed for close vision. Close vision power addition, it is claimed, has the effect of reducing the close vision accommodation effort, and normalizing phoria in close vision. Investigations are being done into the prescription of bifocal or progressive lenses for children; one can notably consult Goss D. A. Uyesugi E. F. (1995) "Effectiveness of bifocal control of childhood myopia progression as a function of near point phoria and binocular cross-cylinder", *J. Optom. Vis. Dev.*, 26, 12–17 and Mur et al (1991) *"Evolution de la myopie d'enfants compensée par progressifs" (Evolution of myopia in children compensated for by progressive lenses) Bulletin de la S.S.C.O.*, 1, 87–92. The results of studies carried out on the subject show that the prescription of a power addition does not appear effective for all myopias.

There additionally exist various devices employing distance measurement between the frame of the spectacle wearer and the point the wearer is looking at. U.S. Pat. No. 5,359,444 discloses spectacles with the lenses containing a nematic material, of variable refractive index as a function of a voltage applied to the material. The voltage applied to the material is a function of the distance measured by an infra-red telemetry device, whereby the lenses are always focused to the distance of the point observed by the spectacle wearer. The infra-red telemetry device comprises a transmitter and a receiver arranged at each side of the spectacle frame.

U.S. Pat. No. 4,181,408 discloses spectacles with deformable lenses. Deformation of the walls of the lenses changes lens power. The frame thus has a device for measuring angular position of the eyes of the spectacle wearer; an infra-red source illuminates the wearer's eyes, and a sensor detects iris position. Lens power is adjusted as a function of the angular position of the wearer's eyes.

U.S. Pat. No. 5,182,585 discloses spectacles of the same type, having deformable lenses. To adjust lens power, that Patent discloses the use of a telemetry device fastened to the frame rather than measurement of the angular position of the wearer's eyes.

International application WO-A-9717043 discloses spectacles for a blind person. A plurality of infra-red transmitters and receivers is arranged on the surface of sunglasses lenses; related electronics convert distance measurements into measurements able to be perceived by the spectacle wearer.

Progressive multifocal ophthalmic lenses are also known. These lenses have a power which continuously varies, between a nominal power at a reference point for far vision, situated at the top part of the lens, and a reference point for close vision, situated at the bottom part of the lens. These lenses are prescribed for presbytic spectacle wearers; power addition is the difference between the power at the close vision reference point and the power at the far vision reference point. Such lenses are for example disclosed in French Patents 2,769,998, 2,769,999 or yet again 2,770,000.

SUMMARY OF THE INVENTION

There consequently exists a need for a solution making it possible to indicate to a spectacle wearer that he has come too close to the close vision reading plane. The invention provides a solution to this problem.

More precisely, the invention provides a spectacle frame, having a least one corrective lens the characteristics of which do not vary over time, and characterised by telemetry means.

In one preferred embodiment, the lens has a negative power adapted to the myopic spectacle wearer's far vision correction. In a further preferred embodiment, the lens is a single focus, bifocal or progressive multifocal lens.

Preferably, the spectacle frame additionally has an alarm which is set off by telemetry means when a distance measured by the telemetry means is less than a predetermined reference distance.

In one preferred embodiment, the spectacle frame additionally has an alarm that is set off by the telemetry means when a distance measured by the telemetry means remains, over a predetermined period, less than a predetermined reference distance. This predetermined duration is preferably greater than the habitual duration of passage of objects passing in front of the frame, and can be for example three seconds. Preferably, the predetermined duration is adjustable.

In one embodiment, the reference distance is less than a distance between the frame and a working plane in a normal position of the spectacle wearer. This distance can for example be determined as a function of the Harmon distance of the spectacle wearer. The Harmon distance is defined below.

Advantageously, the reference distance is comprised between 20 and 50 cm.

In a preferred embodiment, the telemetry means are removable. The alarm can be a visual alarm.

The invention also provides a kit comprising a spectacle frame, telemetry means and an alarm set off by the telemetry means when a distance measured by the telemetry means is less than a predetermined reference distance.

The alarm is advantageously set off by the telemetry means when a distance measured by the telemetry means remains below, over a predetermined duration, a predetermined reference distance. Notably, the predetermined duration is preferably greater than the habitual duration of passage of objects passing in front of the frame. One can choose a duration of three seconds or the duration can be adjustable.

In a preferred embodiment, the reference distance is less than a distance between the frame and a working plane in a normal position of the spectacle wearer. The distance can be determined as a function of the Harmon distance of the spectacle wearer and can be comprised between 20 and 50 cm.

The kit can also comprise at least one lens the characteristics of which do not vary over time and, for example, a negative power lens, or a single-focus, bifocal or multifocal progressive lens.

Further characteristics and advantages of the invention will become more clear from the description which follows of some embodiments of the invention, provided by way of example, with reference to the attached drawings.

BRIEF DESCRIPTION OF OF THE DRAWINGS

DETAILED DESCRIPTION OF THE PREFERRED EMBODIMENTS

The invention provides a device making it possible to indicate to the spectacle wearer that the distance to the close vision working plane is unsuitable.

In the remainder of this description, the invention is described in a first application in which the invention discloses prescribing progressive lenses for children suffering from myopia.

It also discloses, in this case, in order to ensure a correct close vision distance to the work, the provision of a telemetry device on the frame. As progressive lenses, unlike bifocal lenses, do not have a close vision region that is clearly identifiable by the wearer, the invention allows the spectacle wearer to know if the distance to the close vision working plane is correct, in other words if he is using the close vision region effectively for close vision work.

Figure 1:
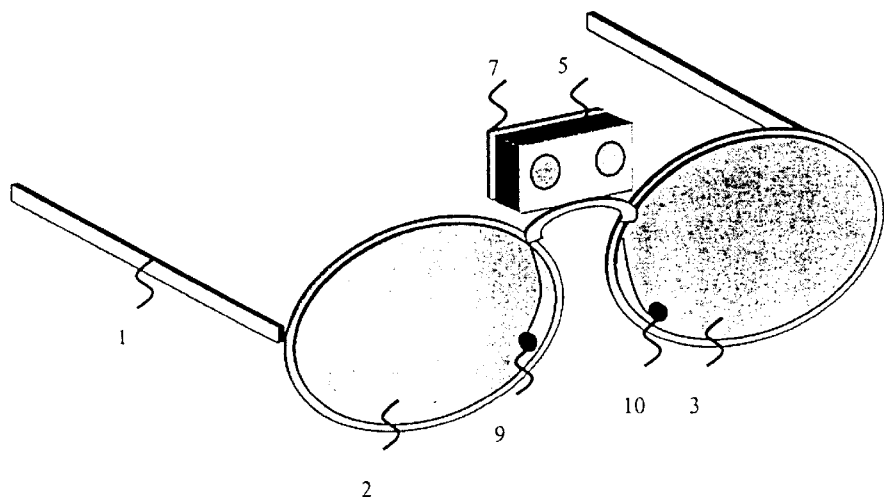
FIG. 1 is a diagramatical view of a frame according to the invention.

FIG. 1 shows, diagrammatically, a spectacle frame accorded to the invention. Frame 1 has at least one progressive lens 2 or 3, in other words a lens having a power that continuously varies between a power value that is adapted to far vision and a power value that is adapted to close vision. It additionally has telemetry means 5 for measuring the distance to the point the spectacle wearer is looking at, or the distance between the working plane and the lens in the frame.

In the embodiment of FIG. 1, the telemetry means comprise infra-red means and, more specifically, an infra-red emitting diode and a sensor sensitive to infra-red; for the telemetry means one can employ a component such as the one sold by the Japanese company Sharp under reference GP2D05. This component has a 2-level output, supplying a voltage of a different value depending on whether the distance measured is greater or less than a reference value. This reference value can be adjusted by means of a potentiometer.

One can also employ other telemetry means apart from the component specified; the telemetry means can supply a signal that is representative of distance, and not a 2-level signal; they can also employ other types of measurement apart from infra-red for measurement in another range of wavelengths, measurement of pupil position, or yet again ultrasound measurement.

FIG. 1 additionally shows a housing 7 which is connected to the telemetry means and which, in the embodiment shown in the FIG., contains the power supply for the component used, as well as furnishing the clock signal applied to the imput of the component; the said clock signal times the measurements done by the telemetry device. A frequency of 2 Hz is suitable.

The telemetry means can set off an alarm when the wearer is too close to the working plane. This alarm allows optimal use of the progressive lens, by inciting the spectacle wearer to return to a natural position, which is comfortable, for close vision. The alarm is advantageously set off when the distance measured by the telemetry means is less than a predetermined reference distance; a value of 20 to 50 centimetres for the reference value is suitable. It is also possible to allow this distance to be adjusted, for example allowing adjustment by the optician who supplied the frame, as a function of the spectacle wearer's age and morphology. The optician could, for example, set the value of the reference distance equal to the so-called Harmon distance. This distance corresponds to the distance between the tip of the elbow and the index finger-thumb junction of the spectacle wearer. According to Harmon, this distance is ideal for close vision work. In the embodiment of FIG. 1, a potentiometer for adjusting the reference distance is provided in the housing 7.

The alarm can be of any nature, be it visual, audible, tactile or otherwise. In the preferred embodiment, a visual alarm is employed which has the advantage of being able to be used without being a nuisance in public, and for example in the classroom. This alarm can consist of two light-emitting diodes 9 and 10 arranged on the frame, so they can be readily seen by the spectacle wearer. These diodes can flash at the clock frequency, using a control device in the housing 7.

It is further advantageous to provide a time delay to avoid setting off the alarm when an object briefly passes between the frame and the working plane; such a passage of an object can be detected by the telemetry means, leading to a distance being measured that is less than the reference distance mentioned above. In order to avoid setting off the alarm unnecessarily, it is possible to provide a time delay. In this way, the alarm is only set off when the distance measured remains below the reference value over a predetermined period. A duration of some three seconds is suitable and has proved to be greater than the habitual duration of a brief passage of an object between the frame and the working plane.

Figure 2:
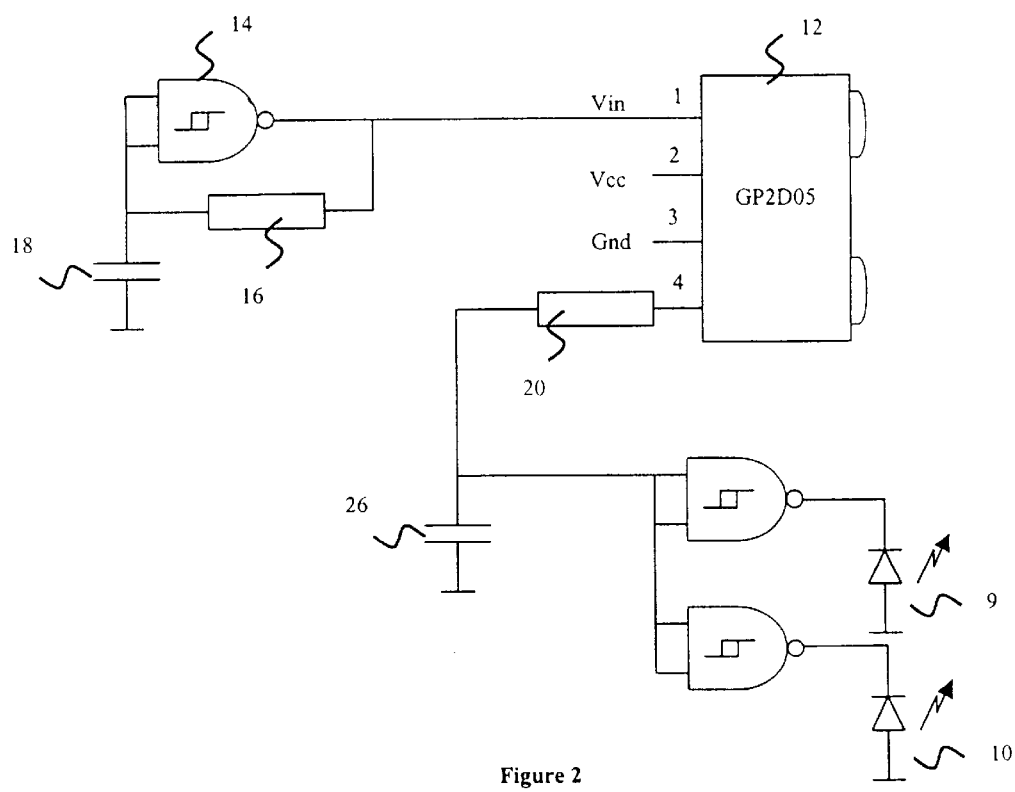
FIG. 2 is a circuit diagram of one embodiment of the invention.

FIG. 2 is a circuit diagram of one embodiment of the invention. The diagram shows the component GPD05, identified by reference 12, having four terminals: the first terminal Vin is connected to the output of an oscillator constituted by a logic gate 14 of the trigger or Schmidt trigger (hysteresis comparator) type, by a capacitor 18 and a resistor 16. The second terminal of component 12 is for power supply and is connected to the supply voltage Vcc. The third terminal is the ground terminal Gnd, and is connected to ground. The fourth terminal is the output terminal supplying the output signal. This is connected to the time delay system constituted by a resistor 20 and a capacitor 26. The midpoint of these components feeds the input to two Schmidt triggers acting as buffers, which supply the diodes.

The operation of the circuit in FIG. 2 is as follows. When the distance measured by the telemetry means is less than a reference distance, the fourth terminal provides an output signal which oscillates at the frequency of the signal applied to the first terminal, between supply voltage and zero Volts. The diodes are not yet powered as the time delay system is operating (charge on capacitor 26). As long as capacitor 26 is not charged, the residual voltage from filtering does not enable triggering of the Schmidt triggers, thereby not activating the diodes. When the capacitor is charged, the flip-flops are triggered, and the diodes flash. If the measured distance is greater than the reference distance, terminal 4 provides a continuous signal of value Vcc. The output from the Schmidt triggers is consequently a value equal to the ground voltage. In this case, the diodes are not powered.

The invention consequently makes it possible, when a distance to the working plane is too small, to indicate, with the aid of the alarm, that the wearer should change position; thus, when the spectacle wearer starts working in close vision, and comes too close to the working plane—a well-known tendency of myopia sufferers, he or she is alerted and can change position. In this way, in the example of a child who has been prescribed progressive lenses, the child is incited to utilize the close vision region of the progressive lens or progressive lenses.

We shall now describe the prescription protocol according to the invention. As indicated above, the invention preferably applies to myopic children, around the age of six to eight, when the signs of acquired myopia start to appear.

Progressive lenses having a suitable correction are prescribed for the child. The spectacle wearer is supposed to wear the spectacles of the invention for close vision work, and notably for reading and writing. He is told that he should raise his head to utilize the lower portion of the lenses for all close vision work, and that an alarm will warn him when the distance is too short; if appropriate, the optician will adjust the reference distance as a function of the child's morphology, and he can for example base this on the Harmon distance.

The invention applies not only to the example described in detail above for prescribing progressive lenses for a child, but also to all situations in which it is appropriate to warn a spectacle wearer that the distance to the working plane in close vision is incorrect. It can be used with single-focus or bifocal lenses or, as in the above example, with progressive lenses. In all cases, unlike the prior art, the lenses employed in the invention are corrective lenses, the characteristics of which do not vary over the course of time. They can be organic or inorganic lenses.

Obviously, the present invention is not limited to the examples and embodiments described and illustrated, but may be the subject of numerous variations available to the person skilled in the art.

Thus, in the preferred embodiment, the telemetry means are fastened onto the frame. One can, more generally, render these means integral with the head of the spectacle wearer without necessarily mounting them on the frame; thus, one can employ another support, for example an elastic headband or yet again provide releasable mounting means for the telemetry means on the frame.

The invention can, in this case, comprise a kit or set of preassembled parts, with a frame, and telemetry means with an alarm.

It is also possible to utilize components other than those described above; all the telemetry, alarm, and electronic means can be integrated into a housing carried by the frame; the power supply can be arranged on the frame, or alternatively be separate from the frame and electrically connected to the telemetry means.

What is claimed is:

1. A spectacle system comprising:
   an optical system having at least one corrective lens through which a wearer of the spectacle frame views objects, wherein the optical system has a fixed optical power with respect to time; and
   a telemetry device attachable to the optical system to determine the distance between the optical system and a viewed object.

2. The spectacle system of claim 1, wherein the lens has a negative power.

3. The spectacle system of claim 1, wherein the lens is a single focus, bifocal or progressive multifocal lens.

4. The spectacle system of claim 1, ftirther comprising an alarm which is set off by the telemetry device when a distance measured by the telemetry device is less than a predetermined reference distance.

5. The spectacle system of claim 1, further comprising an alarm set off by the telemetry device when a distance measured by the telemetry device remains, over a predetermined period, less than a predetermined reference distance.

6. The spectacle system of claim 5, wherein said predetermined duration is three seconds.

7. The spectacle system of claim 5, wherein said predetermined duration is adjustable.

8. The spectacle system of claim 4, wherein the reference distance is less than a distance between the spectacle system and a working plane in a normal position of the spectacle wearer.

9. The spectacle system of claim 4, wherein the reference distance is determined as a function of the Harmon distance of the spectacle wearer.

10. The spectacle system of claim 4, wherein the reference distance is comprised between 20 and 50 cm.

11. The spectacle system of claim 1, wherein the telemetry means are removable.

12. The spectacle system of claim 4, wherein the alann is a visual alarm.

13. The spectacle system of claim 1, wherein the at least one corrective lens includes a non-variable lens shape and a non-variable index of refraction.

14. The spectacle system of claim 1 including a frame, wherein the optical system is held by the frame and the telemetry device is attached to the frame.

15. A kit comprising
   a spectacle system comprising an optical system including at least one colTective lens through which a wearer of the spectacle system views objects;
   a telemetry device attachable to the spectacle system; and
   an alarm set off by said telemetry device when a distance measured by the telemetry device is less than a predetermined reference distance.

16. The kit of claim 15, wherein the alarm is set off by said telemetry device when a distance measured by the telemetry device remains below, over a predetermined duration, a predetermined reference distance.

17. The kit of claim 16, wherein said predetermined duration is three seconds.

18. The kit of claim 16, wherein said predetermined duration is adjustable.

19. The kit of claims 15, wherein the reference distance is less than a distance between the spectacle system and a working plane in a normal position of the spectacle wearer.

20. The kit of claims 15, wherein the reference distance is determined as a function of the Harmon distance of the spectacle wearer.

21. The kit of claims 15, wherein the reference distance is comprised between 20 and 50 cm.

22. The kit of claims 15, wherein the telemetry device is removably mounted on the spectacle system.

23. The kit of claims 15, wherein the alarm is a visual alarm.

24. The kit of claims 15, further comprising at least one lens the characteristics of which do not vary over time.

25. The kit of claim 24, further comprising a single-focus, bifocal or multifocal progressive lens.

26. The kit of claim 15, wherein the at least one corrective lens includes a non-variable lens shape and a non-variable index of refraction.

27. The kit of claim 15, wherein the spectacle system includes a frame, and the optical system is held by the frame and the telemetry device is attached to the frame.

* * * * *